May 15, 1962 J. LUND 3,034,622
SPRAG AND RETAINER ASSEMBLY FOR ONE-WAY CLUTCHES
Filed Oct. 22, 1957 2 Sheets-Sheet 1

INVENTOR.
JOHAN LUND
BY
Whittemore Halbert & Belknap
ATTORNEYS

May 15, 1962 J. LUND 3,034,622
SPRAG AND RETAINER ASSEMBLY FOR ONE-WAY CLUTCHES
Filed Oct. 22, 1957 2 Sheets-Sheet 2

INVENTOR.
JOHAN LUND
BY
*Whittemore Hulbert Belknap*
ATTORNEYS

3,034,622
SPRAG AND RETAINER ASSEMBLY FOR ONE-WAY CLUTCHES

Johan Lund, Detroit, Mich., assignor to Formsprag Company, Van Dyke, Mich., a corporation of Michigan
Filed Oct. 22, 1957, Ser. No. 691,608
5 Claims. (Cl. 192—45.1)

The invention relates to one-way clutches of the sprag type and has for its object the obtaining of a construction of sprag and retainer assembly having various advantageous features including:

(1) The retainer forms a bearing for holding the raceways closely to concentric relation when declutched.

(2) The retainer can be formed as a die casting and of material having good bearing qualities.

(3) The sprags in clutching and declutching move independently of the retainer without actuating or stressing the latter, thereby avoiding breakage in case the retainer should stick in a raceway.

(4) The sprag and retainer assembly forms a package for transportation and for engagement with or disengagement from the raceways.

(5) The retainer holds from disengagement not only the sprags but the energizing springs therefor which latter engage end notches in said sprags.

With these and other advantageous features in view, the invention consists in the construction as hereinafter set forth.

Figure 5:
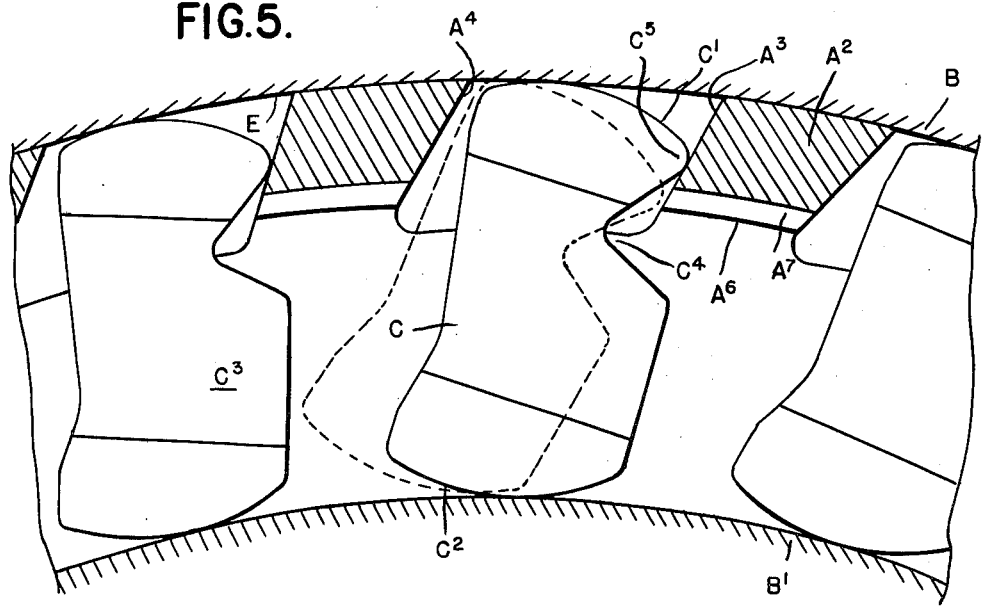
FIG. 5 is a section through the clutch and the plane of rotation showing the sprags in elevation.
Figure 6:
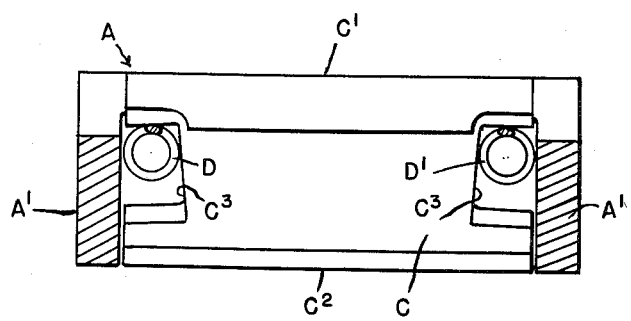
FIG. 6 is a cross section therethrough.

The sprags are spaced by the retainer preferably in individual pockets but each is free to move as required for clutching and declutching independently of any movement of said retainer. This is accomplished by the specific construction as will be later described. Generally the retainer A is an annular channel member of U-shaped cross section having side flanges A' adjacent to opposite ends of the sprag and spaced cross bars $A^2$ connecting said side flanges and located adjacent to the outer raceway B. The radial dimension of these side flanges is such as to form a spacer between said outer raceway B and the inner raceway B' holding the two concentric within close tolerance. The sprags C are in the pockets between the adjacent spaced cross bars $A^2$ and are formed with outer and inner cam faces C' and $C^2$ which, when rotated (counter clockwise as shown in FIG. 5) will wedge between the raceways thereby effecting the clutching. Energizing garter springs D and D' engaging opposite end notches $C^3$ in the sprags, energize them for clutching engagement. However, in actual clutching, the sprags will rotate farther for the necessary stressing of the parts and in doing so, will roll on the outer or driven raceway B. This might tend to also move the retainer particularly if the spaces between the cross bars were bounded by radial faces. There would be no objection to this were the retainer free from the raceway but it sometimes happens that, due to differential expansion or other causes, these parts may stick together. In that case something will break, probably some of the cross bars.

One of the advantageous features of my invention is that such rolling movement of the sprags will not impart any movement to the retainer which I accomplish as follows:

The cross bars $A^2$ have the opposite faces $A^3$ and $A^4$ thereof acutely inclined or oblique in a generally similar sense relative in a generally similar, radially outwardly and circumferentially forward relation to a radial line and advancing in the direction of rotation from the inner to the outer surface of said cross bars. This will provide clearance for the outer cam face C' when rolling in contact with the outer raceway B even if the retainer is immovable in relation to the later. To further provide clearance, the sprags are notched in their advanced faces, or otherwise made more acutely angled than the surface $A^3$, as indicated at $C^4$ leaving only a nose portion $C^5$ for movement in the space between the cross bars $A^2$. Consequently, the movement of the sprags in clutching will neither move nor stress the retainer. Briefly described, the sprags substantially fit pockets between the cross bars of the retainer but have conjugated surfaces slidably engaging the cross bars and permitting limited rolling advancement of the sprags without imparting movement to or stressing the retainer.

If the sprags were free for unlimited rolling in contact with the outer raceway, it might happen that in the over-running of the clutch, these sprags would be turned into an inoperative position from which they would not be returned by the energizing springs. It is, therefore, necessary to provide a stop for limiting the turning of each sprag. For such purpose the central portion $A^6$ of the cross bars $A^2$ extends radially inward in a sufficient distance to form said stop. However, adjacent to the side flanges A' these bars are grooved at $A^7$ to provide sufficient clearance for operation of the sprags by the energizing garter springs D and D'. These springs engage notches in the ends of the sprags and are held therein by the side flanges A'. When assembled, these garter springs, which are radially outwardly expandable, will energize the sprags to bias the same to roll in a clockwise direction along the outer race member E (FIG. 5), but, as aforesaid, will not move the retainer.

Figure 1:
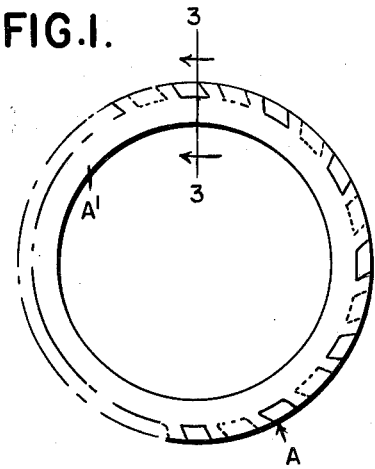
FIG. 1 is a front elevation of the sprag retainer.
Figure 2:
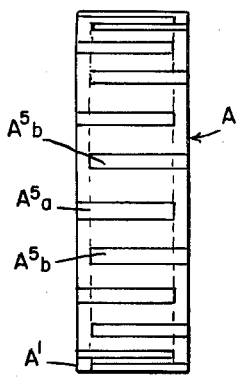
FIG. 2 is a side elevation thereof.
Figure 3:
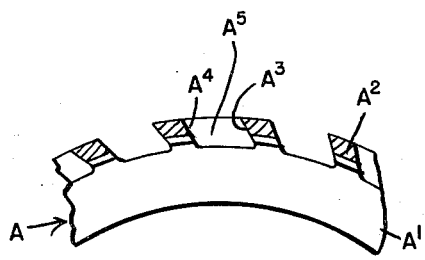
FIG. 3 is a cross section on line 3—3 of FIG. 1.
Figure 4:
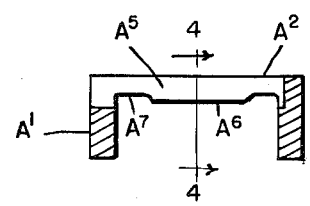
FIG. 4 is a section on line 4—4 of FIG. 3.

The retainer may be formed as a die casting of metal having good bearing qualities. It is necessary, however, in forming the pockets $A^5$ between cross bars to have them open through one of the side flanges A' and alternately at opposite sides. This will permit withdrawing the dies from the casting. This is shown in FIG. 2 in which the pockets $A^5a$ open to the left and the adjacent pockets $A^5b$ open to the right.

The sprag retainer assembly, as above described, forms a package for transportation and for engagement with the raceway members of the clutch. Also, when assembled with said raceways to form a one-way clutch it has in addition to its general function the advantageous features above referred to.

Figure 7:
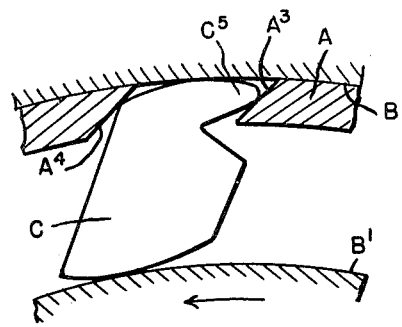
FIG. 7 is a view similar to FIG. 5 slightly modified illustrating the clutch when overrunning.

When the clutch is over-running the inertia of the sprags C will move them in the direction from solid to dotted line position, as viewed in FIG. 5, and, as shown in FIG. 7, contact each with the rear face $A^4$ of its pocket in the retainer A while the nose portion $C^5$ of its advance face will hook over the inclined face $A^3$ of said pocket. This will align all of the sprags preventing any skewing thereof and conditioning the same for clutching engagement.

What I claim as my invention is:

1. A one-way, sprag type clutch, comprising radially spaced circumferential raceways, sprags positioned in an annular series between said raceways, said sprags having arcuate cam faces for rolling engagement with one of said raceways, and an annular retainer having means defining circumferentially spaced pockets receiving and positioning said sprags, said pockets having circumferentially opposed surfaces adjacent the sprags which are acutely inclined in a similar sense and at generally corresponding non-parallelism to a radius through the pocket and the axis of the retainer, said sprags each being recessed at a portion thereof facing a pocket surface to at least in part define on the sprag, a surface of limited radial dimension facing one of the respective pocket surfaces and in limited non-radial sliding contact therewith, during rolling engagement of its cam surface with the raceway, without imparting substantial force to said retainer to move the later.

2. A one-way, sprag type clutch, comprising radially spaced circumferential raceways, sprags positioned in an annular series between said raceways, said sprags having arcuate cam faces for rolling engagement with one of said raceways, and an annular retainer having means defining circumferentially spaced pockets receiving and positioning said sprags, said pockets having circumferentially opposed surfaces adjacent the sprags which are acutely inclined throughout their radial depth in a similar sense and at generally corresponding non-parallelism to a radius through the pocket and the axis of the retainer, said sprags each being recessed at a portion thereof facing a pocket surface to at least in part define on the sprag, a surface of limited radial sliding contact therewith, during rolling engagement of its cam surface with the raceway, without imparting substantial force to said retainer to move the later.

3. A one-way, sprag type clutch, comprising radially spaced circumferential raceways, sprags positioned in an annular series between said raceways, said sprags having arcuate cam faces for rolling engagement with one of said raceways, and an annular retainer having means defining circumferentially spaced pockets opening in substantial alternation on opposite axial sides of the retainer and receiving and positioning said sprags, said pockets having circumferentially opposed surfaces adjacent the sprags which are acutely inclined in a similar sense and at generally corresponding non-parallelism to a radius through the pocket and the axis of the retainer, said sprags each having a surface of limited radial dimension facing one of the respective pocket surfaces and in limited non-radial sliding contact therewith, during the rolling engagement of its cam surface with the raceway, without imparting substantial force to said retainer to move the later.

4. A one-way, sprag type clutch, comprising radially spaced circumferential raceways, sprags positioned in an annular series between said raceways, said sprags having arcuate cam faces for rolling engagement with one of said raceways, and an annular retainer having means defining circumferentially spaced pockets opening in substantial alternation on opposite axial sides of the retainer and receiving and positioning said sprags, said pockets having circumferentially opposed surfaces adjacent the sprags which are acutely inclined throughout their radial depth in a similar sense and at generally corresponding non-parallelism to a radius through the pocket and axis of the retainer, said sprags each having a surface of limited radial dimension facing one of the respective pocket surfaces and in limited non-radial sliding contact therewith, during rolling engagement of its cam surface with the raceway, without imparting substantial force to said retainer to move the latter.

5. A sprag and retainer assembly for one-way clutches and the like, comprising an annular series of sprags, and an annular retainer having opposite, axially spaced sides embracing the sprags, and means between said sides providing pockets receiving and separating the sprags from one another, said pockets opening axially and in alternation through said respective opposite retainer sides, said last named means providing surfaces circumferentially facing said respective pockets which are acutely angled and in non-parallel relation to radii through the axis of said retainer.

References Cited in the file of this patent

UNITED STATES PATENTS

| | | |
|---|---|---|
| 2,366,842 | Dodge et al. | Jan. 9, 1945 |
| 2,389,961 | Dodge | Nov. 27, 1945 |
| 2,404,221 | Dodge | July 16, 1946 |
| 2,428,962 | Davis | Oct. 14, 1947 |
| 2,486,262 | Davis | Oct. 25, 1949 |
| 2,576,337 | Farkas | Nov. 27, 1951 |
| 2,753,028 | Dodge | July 3, 1956 |
| 2,777,551 | Banker | Jan. 15, 1957 |
| 2,824,636 | Troendly et al. | Feb. 25, 1958 |